Jan. 7, 1969  E. B. FITCH  3,420,624
AMMONIUM PHOSPHATES
Filed July 24, 1967
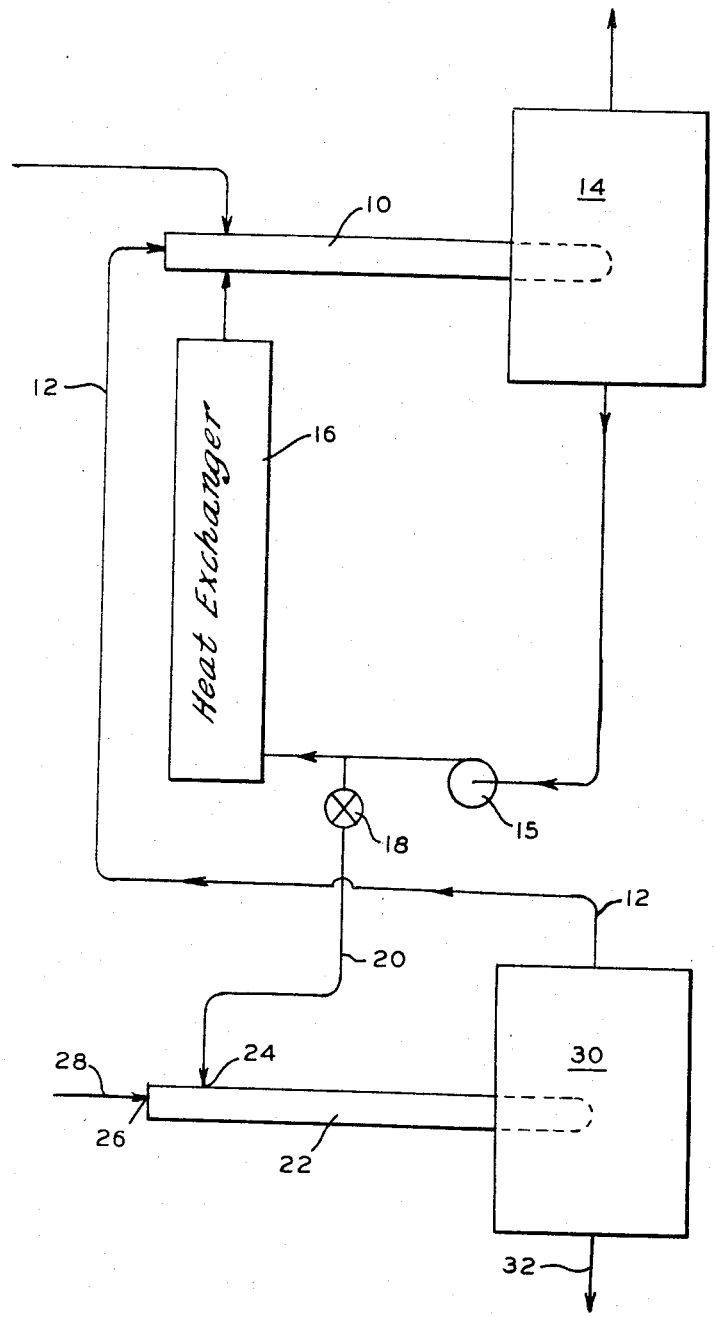
INVENTOR
ELLIOT B. FITCH
BY Arnold Grant
ATTORNEY

United States Patent Office 3,420,624
Patented Jan. 7, 1969

3,420,624
AMMONIUM PHOSPHATES
Elliot B. Fitch, Weston, Conn., assignor to Dorr-Oliver Incorporated, Stamford, Conn., a corporation of Delaware
Filed July 24, 1967, Ser. No. 655,573
U.S. Cl. 23—107                  2 Claims
Int. Cl. C01b 25/28

ABSTRACT OF THE DISCLOSURE

A process for generating ammonium polyphosphate from merchant grade orthophosphoric acid and ammonia which utilizes a first stage having a pipe reactor and a heat exchanger in series to partially ammoniate and concentrate the phosphoric acid. The product of the first stage is then transferred to a second stage pipe reactor and fresh ammonia is added to complete the ammoniation process.

---

The preparation of ammonium polyphosphate from orthophosphoric acid and ammonia is generally performed by either of two processes. In the first of these methods orthophosphoric acid, preferably generated by the less expensive wet process, is partially dehydrated to contain both ortho and polyphosphoric acid. This acid, known in the art as superphosphoric acid, is then ammoniated to produce a melt of ammonium polyphosphate, which is then granulated and sold as dry fertilizer. Although the potential market for ammonium polyphosphate has increased during the last few years because of its extremely high $P_2O_5$ content, the inordinate expenses associated with its manufacture have reduced its commercial attractiveness and depressed the demand. Elaborate and expensive concentrators are required to dehydrate the wet process orthophosphoric acid to an acid containing about 70% $P_2O_5$ prior to the ammoniation step. The complexity of these concentrators not only makes them difficult to operate, but, in addition, the merchant grade acid used in the concentration must be specially selected and purified, which further increases the total cost.

The second method, which has only recently come into prominence, is based on the discovery that the ammonium polyphosphate can be generated by the direct combination of orthophosphoric acid and ammonia. It was theorized that the heat given off in the neutralization reaction between the phosphoric acid and the ammonia should be sufficient to drive off the excess water and convert the ammonium orthophosphate to ammonium polyphosphate.

A number of processes were devised by those skilled in the art to try and take advantage of this theoretically proposed heat balance. The most prominent of these is a two stage, counter-current method wherein the orthophosphoric acid is introduced to a first tank reactor and the ammonia is added to a second tank reactor. In the first tank the phosphoric acid is partially ammoniated by excess ammonia moving countercurrently from the second tank. The partially ammoniated product from the first tank is then transferred to the second tank where it is contacted by the freshly added ammonia and the ammoniation process is completed. Excess ammonia from the second tank is then, as explained above, transferred to the first tank, and the ammonium polyphosphate is withdrawn from the second tank, cooled, and then granulated.

Practical application of this method has, however, revealed two serious problems, first merchant grade acid creates an inordinate amount of foam in both tanks and second, the heat released by the first, partial ammoniation, reaction does not reach the level of theoretical expectation so that heat must be added to the second, completion ammoniation, tank to effect the conversion from ammonium orthophosphate to ammonium polyphosphate. The addition of heat further complicates the foaming problem because the amount of foam produced is proportional to the amount of heat added to the system, i.e., the more heat, the more foam. This inherent drawback of the system, requiring additional capital expenditures for foam handling and breaking equipment, has had a deleterious effect on its commercial application and economic attractiveness.

It is therefore an object of the present invention to overcome the above mentioned problems and to improve the economics of generating ammonium polyphosphate directly from merchant grade orthophosphoric acid and ammonia. Applicant has found that these problems can be solved by first, performing the reactions in pipe reactors instead of tank reactors; and, second, adding the necessary heat to the first stage of the system instead of the second stage.

The prior art has demonstrated that over ammoniation of the first stage results in crystallization of monoammonium phosphate and solidification of the solution. Thus it would appear that the addition of heat to the first stage of the system, as applicant proposes, would boil off water similarly causing crystallization and solidification. However, applicant has found that after partial ammoniation the solution can be concentrated by evaporation at essentially atmospheric pressure much further than needed, in practice of the invention, without danger of solidfication. Although applicant is not sure, he theorizes that the shearing effect of the constantly moving liquid through the relatively narrow confines of the pipe reactor is responsible for reducing any foam caused to tolerable proportions.

It is therefore another object of the present invention to add heat, concentrate and partially ammoniate orthophosphoric acid prior to complete ammoniation to ammonium polyphosphate.

It is yet another object of the present invention to generate ammonium polyphosphate from merchant grade orthophosphoric acid and ammonia in a two stage system utilizing pipe reactors.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawing which is a diagrammatic representation of a flow sheet for generating ammonium polyphosphate from orthophosphoric acid and ammonia incorporating the present invention.

Referring now to the drawing a first pipe reactor 10, which may be provided with an insulated jacket to prevent heat loss, is fed with merchant grade orthophosphoric acid, preferably having a $P_2O_5$ content in the range of 50–58%. Excess ammonia-bearing vapors, generated in a manner to be presently described, are introduced into the reactor 10 through line 12 to combine with, and partially ammoniate the orthophosphoric acid. The products of this first stage of the system, i.e., partially ammoniated phosphoric acid, water vapor and some remaining excess ammonia proceed through the pipe reactor 10 and are discharged into a first receiver 14 to remove and vent the excess vapors. A pump 15, which may be used to increase and assist the flow of material through the system, transfers the partially ammoniated product of the reactor from the receiver 14 to a heat exchanger 16. The heat exchanger, raises the temperature of the partially ammoniated product, which is then recycled back to the first pipe reactor 10 where the free water is flashed off to concentrate the product.

It is understood, of course, that the process is continuous and that additional fresh orthophosphoric acid is being added to the reactor and is being partially ammoniated while the recycled product is having its degree of concentration increased.

The recycled partially ammoniated product continues its circuitous path increasing its degree of concentration until the first stage of the system is considered to be "on stream". At this juncture a by-pass valve 18 is opened and a portion of the superheated, concentrated partially ammoniated product is drawn off through line 20 and introduced into the second stage of the system. A pipe reactor 22, having two inlets 24, 26 receives the partially ammoniated product from line 20 and fresh ammonia vapor from line 28. The incoming ammonia, reacts with the hot, partially ammoniated product to complete the ammoniation process up to the desired value. The heat derived from the first stage tof the process when coupled with the heat generated in the final ammoniation reaction is sufficient to raise the temperature into the range of 450–500° F. and thus drive off enough of the combined water to transform the ammoniun orthophosphate to ammonium polyphosphate.

The final product, which is a melt, flows from pipe reactor 22 into a second receiver 30 to vent the vapors, consisting mainly of steam and excess ammonia. These gases then proceed through line 12 to the first stage of the system to be utilized in the manner just described. The ammonium polyphosphate melt discharges through conduit 32 and is then cooled and granulated.

The material and heat balances are controlled as follows: The flow of merchant grade phosphoric acid into first stage pipe reactor 10 is first set at a predetermined rate. The flow of ammonia vapor through line 28 into second stage pipe reactor 22 is then set so that the pH of a test solution produced from the ammonium polyphosphate melt flowing into second receiver 30 is maintained at approximately 1.5. Should the pH increase the flow of ammonia is decreased; alternatively, if the pH should decrease the flow of ammonia gas is increased. The flow of the heat transfer agent or medium through heat exchanger 16 is controlled so that the final product temperature falls within the desired 450–500° F. range.

The following example is merely intended to illustrate the invention and should not be considered to be limiting, as many equivalent procedures will be obvious to one skilled in the art from a study thereof.

Example

In a reactor system with the apparatus described above, a merchant grade phosphoric acid having a $P_2O_5$ content of about 54% is pumped at a rate of approximately 6,667 pounds per hour into first stage pipe reactor 10, operated at approximately 275° F. Approximately 100 pounds per hour of superheated recycle material comprising partially ammoniated product at a temperature in the range of 450–500° F. is delivered through line 20 from heat exchanger 16, to first stage pipe reactor 10. Approximately 1,100 pounds per hour of excess ammonia and other excess gases are delivered through line 12 to reactor 10 where they are then reacted with the incoming phosphoric acid and recycled product and transferred to receiver 14. In receiver 14 steam and a very small quantity of ammonia are removed and the partially ammoniated and partially concentrated reaction product is transferred at a temperature of approximately 300 to 325° F. The product is then pumped by pump 15 at a rate of approximately 200 gallons per minute to heat exchanger 16 and line 20. The recycle is pumped at a rate of approximately 100 pounds per hour to heat exchanger 16. This heat exchanger is a shell and tube type containing 170 tubes 12 feet long, each with ¾ inch outside diameters. This heat exchanger is heated with any conventional heat exchange fluid such as Dowtherm A vapor at about 500° F. and the product is discharged to the first stage pipe reactor 10 at a temperature of approximately 325° F. The partially ammoniated product, which is at a pH of approximately 1.5 is pumped through line 20 by valve 18 at a rate of approximately 6,200 pounds per hour to second stage pipe reactor 22. Reactor 22 is a pipe reactor 10 inches in diameter and 10 feet long, it is operated at a temperature between 450–500° F. and in this reactor the product is ammoniated to its final value by pumping through line 28 approximately 870 pounds per hour of ammonia vapor. The reaction product from pipe reactor 22 is delivered to second receiver 30 and approximately 1,100 pounds per hour of excess gases such as ammonia, steam, etc. are vented through line 12 and approximately 6,000 pounds per hour of ammonium polyphosphate containing from 11 to 12% nitrogen and about 58 to 60% $P_2O_5$, with about half of the $P_2O_5$ present in the non-ortho form.

As this invention may be embodied in several forms without departing from the spirit or essential character thereof, the present embodiment is illustrative and not restrictive. The scope of the invention is described by the appended claims rather than by the description preceding them and all embodiments which fall within the meaning and equivalency of the claims are, therefore, intended to be embraced by those claims.

I claim:
1. A process for generating ammonium polyphosphate by reacting phosphoric acid and ammonia comprising:
   (a) introducing phosphoric acid and ammonia to a first pipe reactor and partially ammoniating the phosphoric acid;
   (b) transferring partially ammoniated product from the first pipe reactor to a heat exchanger;
   (c) recycling at least a part of the heated product from the heat exchanger back to the first pipe reactor to release water vapor;
   (d) transferring at least a part of the recycled concentrated partially ammoniated product to a second pipe reactor;
   (e) introducing additional ammonia to the second pipe reactor to complete the ammoniation of the product; and,
   (f) utilizing the heat generated in the complete ammoniation reaction to transform at least a part of the ammonium orthophosphate to ammonium polyphosphate.

2. Process according to claim 1 wherein the additional ammonia introduced in the second pipe reactor is in excess of that required for complete ammoniation of the partially ammoniated product, the excess being transferred to the fist pipe reactor for the partial ammoniation of the phosphoric acid.

References Cited

UNITED STATES PATENTS

| 2,902,342 | 9/1959 | Kerley | 23—107 |
| 3,310,371 | 3/1967 | Lutz | 23—107 |
| 3,382,059 | 5/1968 | Getsinger | 71—34 |

EARL C. THOMAS, *Primary Examiner.*

L. A. MARSH, *Assistant Examiner.*